(12) United States Patent
Quercia et al.

(10) Patent No.: US 8,291,727 B2
(45) Date of Patent: Oct. 23, 2012

(54) APPARATUS FOR MANUFACTURING CERAMIC MICROSPHERES FOR CEMENTING APPLICATIONS

(75) Inventors: George Quercia, Caracas D.F. (VE); Yibran Perera, San Antonio de los Altos (VE); Aiskely Blanco, San Antonio de los Altos (VE); Fedymar Pereira, Edo. Miranda (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 12/971,756

(22) Filed: Dec. 17, 2010

(65) Prior Publication Data

US 2011/0138859 A1    Jun. 16, 2011

Related U.S. Application Data

(62) Division of application No. 12/327,831, filed on Dec. 4, 2008, now Pat. No. 7,884,055.

(51) Int. Cl.
*C03B 27/008* (2006.01)
*C21C 5/38* (2006.01)
*C21C 5/40* (2006.01)

(52) U.S. Cl. ............... 65/21.1; 65/19; 65/21.2; 266/157

(58) Field of Classification Search ................ 65/19–20, 65/21.1–21.5; 266/157
See application file for complete search history.

(56) References Cited

U.S. PATENT DOCUMENTS

| | | | | |
|---|---|---|---|---|
| 2,460,977 A | * | 2/1949 | Davis et al. ..................... | 65/21.3 |
| 2,533,633 A | | 12/1950 | Schott | |
| 2,676,892 A | * | 4/1954 | McLaughlin ................. | 106/681 |
| 3,054,139 A | * | 9/1962 | Bartholomew et al. ........... | 65/19 |
| 3,293,014 A | * | 12/1966 | Callander et al. ............... | 65/21.2 |
| 3,341,314 A | * | 9/1967 | Vukasovich et al. ........... | 65/142 |
| 3,594,142 A | | 7/1971 | Margesson et al. | |
| 3,645,708 A | * | 2/1972 | Grady ............................... | 65/19 |
| 4,277,273 A | * | 7/1981 | Legille et al. ..................... | 65/19 |
| 4,662,941 A | | 5/1987 | Hagerman | |
| 4,761,183 A | | 8/1988 | Clarke | |
| 4,961,770 A | * | 10/1990 | Johnson et al. ................. | 65/21.3 |
| 5,055,240 A | * | 10/1991 | Lee et al. ........................ | 264/5 |
| 5,058,679 A | | 10/1991 | Hale et al. | |
| 5,082,483 A | * | 1/1992 | Spencer et al. .................. | 65/19 |
| 5,253,991 A | | 10/1993 | Yokota et al. | |
| 5,346,012 A | | 9/1994 | Heathman et al. | |
| 5,379,840 A | | 1/1995 | Cowan et al. | |

(Continued)

FOREIGN PATENT DOCUMENTS

CA        2659669 A1    2/2008

(Continued)

OTHER PUBLICATIONS

Bethlehem Burners, PMDC-2 Water Cooled Bench Burner, as viewed at http://www.bethlehemburners.com/pm2d.htm on Nov. 9, 2011.*

(Continued)

*Primary Examiner* — Matthew Daniels
*Assistant Examiner* — Jodi C Franklin
(74) *Attorney, Agent, or Firm* — Bachman & LaPointe, P.C.

(57) ABSTRACT

A method and apparatus for manufacturing ceramic microspheres from industrial slag. The microspheres have a particle size of about 38 microns to about 150 microns. The microspheres are used to create a cement slurry having a density of at least about 11 lbs/g. The resultant cement slurry may then be used to treat subterranean wells.

5 Claims, 1 Drawing Sheet

U.S. PATENT DOCUMENTS

| | | | |
|---|---|---|---|
| 5,515,921 A | 5/1996 | Cowan et al. | |
| 5,553,670 A | 9/1996 | Cowan | |
| 5,588,489 A | 12/1996 | Chatterji et al. | |
| 6,258,456 B1 | 7/2001 | Meyer | |
| 6,354,108 B1 * | 3/2002 | Toyota | 65/19 |
| 6,360,563 B1 * | 3/2002 | Gerhardt et al. | 65/21.1 |
| 6,610,243 B1 * | 8/2003 | Ulveling et al. | 266/142 |
| 6,626,242 B2 | 9/2003 | D'Almeida et al. | |
| 6,813,902 B2 * | 11/2004 | Streicher et al. | 65/21.1 |
| 6,832,652 B1 | 12/2004 | Dillenbeck et al. | |
| 7,237,679 B1 * | 7/2007 | Hendrickson et al. | 209/638 |
| 7,240,520 B2 * | 7/2007 | Edlinger | 65/454 |
| 7,373,981 B2 | 5/2008 | Kulakofsky et al. | |
| 7,390,356 B2 | 6/2008 | Kulakofsky et al. | |
| 7,442,248 B2 | 10/2008 | Timmons | |
| 7,455,798 B2 | 11/2008 | Datta et al. | |
| 7,884,055 B2 * | 2/2011 | Quercia et al. | 507/140 |
| 2003/0084823 A1 | 5/2003 | Piniecki | |
| 2003/0180537 A1 | 9/2003 | Meyer | |
| 2004/0107875 A1 | 6/2004 | Drochon et al. | |
| 2004/0148966 A1 * | 8/2004 | Celikkaya et al. | 65/17.4 |
| 2004/0259713 A1 * | 12/2004 | Frey | 501/33 |
| 2005/0109507 A1 | 5/2005 | Heathman et al. | |
| 2005/0199009 A1 * | 9/2005 | Lee | 65/21.3 |

FOREIGN PATENT DOCUMENTS

| | | | |
|---|---|---|---|
| EP | 0621247 A2 | 10/1994 | |
| EP | 0685026 B1 | 5/1997 | |
| GB | 2387593 A | 10/2003 | |
| JP | 4001306 A | 1/1992 | |
| JP | 4285043 A | 10/1992 | |
| JP | 5058684 A | 3/1993 | |
| JP | 5105489 A | 4/1993 | |
| JP | 6183795 A | 7/1994 | |
| JP | 8157246 A | 6/1996 | |
| JP | 2005119935 A | 5/2005 | |
| WO | 03/087010 A1 | 10/2003 | |
| WO | 2008018966 A2 | 2/2008 | |

OTHER PUBLICATIONS

Canadian Office Action on Patent Application No. 2,674,963 dated Oct. 25, 2010.

* cited by examiner

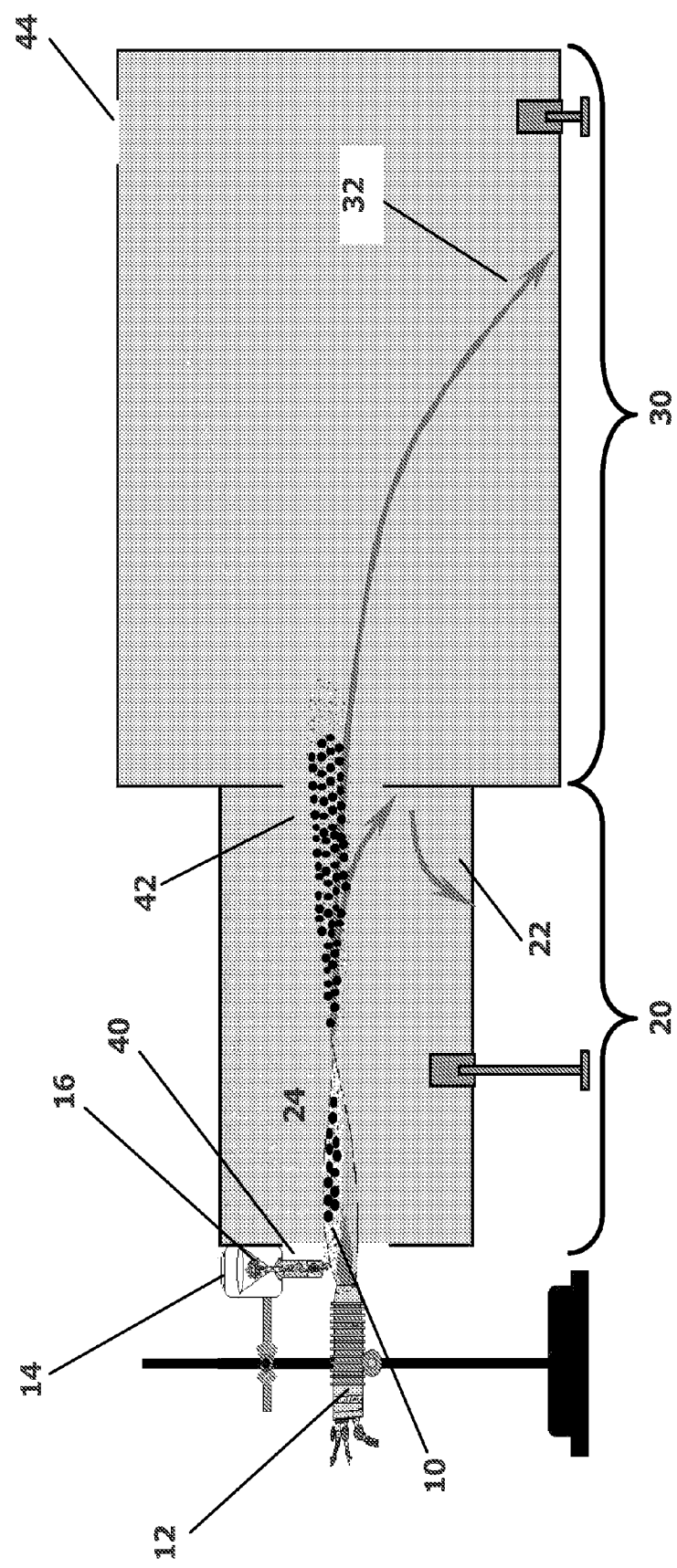

APPARATUS FOR MANUFACTURING CERAMIC MICROSPHERES FOR CEMENTING APPLICATIONS

CROSS-REFERENCE TO RELATED APPLICATIONS

This application is the U.S. divisional application of U.S. application Ser. No. 12/327,831 filed Dec. 4, 2008, now U.S. Pat. No. 7,884,055.

BACKGROUND OF THE INVENTION

This invention relates to the application of industrial slags to manufacture ceramic microspheres for use in cementing applications, more particularly, to the manufacturing of controlled size hollow, cellular and solid microspheres, which have latent pozzolanic properties as well as weak magnetic properties, from blast furnace slags and industrial steel furnace slags. The ceramic microspheres can be used for conventional cementing oil and gas well operations, for instance to replace Portland Cement in mud-to-cement (MTC) technology and/or blast furnace slag and also for the construction areas.

Portland cement is a hydraulic cement made by heating a limestone and clay mixture in a kiln and pulverizing the resulting material. The most common use for Portland cement is in the production of concrete. Portland cement is also used in mortars, such as with sand and water only, for plasters and screeds, and in grouts, such as cement/water mixes squeezed into gaps to consolidate foundations, road-beds, etc.

Blast furnace slag (BFS) is a by-product produced in the manufacturing of iron, iron ore, iron scrap and limestone fluxes or dolomite fluxes. BFS is nonmetallic and consists primarily of silicates, alumninosilicates and calcium-alumina-silicates.

Industrial steel furnace slags (SFS) are a by-product in the manufacturing of steel and/or steel alloys. SFS is a nonmetallic product that is developed simultaneously with steel in basic oxygen, electric, or open-hearth furnaces. It consists of calcium silicates and ferrites combined with fused and mineralogical combined oxides of iron, aluminum, manganese, calcium and magnesium.

In cementing applications, such as steam injection techniques and other oil extraction processes that require increased well temperatures, the cementing material used must be able to withstand elevated temperature and thermal cycling associated with steam flood. The conventional Portland cement and also water based drilling fluids mixed with Portland cement exhibit high thermal degradations. This degradation damages the well resulting in repairs which increase operation costs. In steam injection techniques, the use of ceramic microspheres in cementing applications leads to a lightweight grout that is resistant to elevated temperatures and thermal cycling.

In some regions of the world where steam injection techniques are employed, BFS is not readily available and is therefore imported. The high costs associated with importing BFS compounded by the unknown heterogeneous chemical composition of the BFS, unknown remaining crystalline phases in the BFS and the potential need for an additional milling process is a disadvantage suffered by regions of the world that do not produce BFS. By combining hollow microspheres of composition similar to BFS, steam injection resilient lightweight grouts of low density have been obtained.

The use of ceramic microspheres for cementing applications results in substantial savings by reducing the environmental impact of the cementing application, reducing the consumption of oilfield cement and by replacing the need to import expensive cementing additives.

The ceramic microspheres for cementing applications of the present invention may replace BFS and/or Portland Cement in any well cementing operation. The ceramic microspheres of the present invention are an advantageous well cementing constituent that may be successfully implemented in differing temperature dependent processes, such as the steam injection technique employed for heavy crude oil extraction.

SUMMARY OF THE INVENTION

The primary object of the present invention is the creation of hollow, cellular and solid microspheres, i.e. ceramic microspheres and/or microspheres, of a controlled size from blast furnace slag and steel furnace slags. These novel ceramic microspheres exhibit latent pozzolanic properties as well as weak magnetic properties.

It is a further object of the present invention to provide a method of manufacturing ceramic microspheres from industrial slags for well cementing applications.

It is yet a further object of the present invention to provide an apparatus for the manufacturing of ceramic microspheres from industrial slags.

In accordance with the present invention a method for manufacturing ceramic microspheres is disclosed which comprises the steps of obtaining industrial slag; manufacturing microspheres from the industrial slag, wherein the microspheres have a particle size of about 38 microns to about 150 microns; and, using the microspheres to make a cement slurry, wherein the cement slurry has a density of at least about 11 pounds per gallon (lb/g).

In further accord with the present invention a method for treating subterranean oil and gas wells is disclosed comprising the steps of obtaining industrial slag; manufacturing microspheres from the industrial slag, wherein the microspheres have a particle size of about 38 microns to about 150 microns; using the microspheres to make a cement slurry, wherein the cement slurry has a density of at least about 11 lb/g (1318 kg/m3), and; deploying the cement slurry into a subterranean well.

Also in further accord with the present invention an apparatus for manufacturing microspheres from industrial slag is disclosed comprising a vibration feeder, a glass bench burner, a first collection chamber, and a second collection chamber.

BRIEF DESCRIPTION OF THE DRAWINGS

A detailed description of preferred embodiments of the present invention follows, with reference to the attached drawings, wherein:

FIG. 1 illustratively depicts the slag spheroidization device.

DETAILED DESCRIPTION

The invention relates to a method for the manufacturing of ceramic microspheres from spheroidized industrial slag.

Hereinafter the term "well" is used to refer to any one or all of the following terms: reservoir, oil well, gas well, marginal well, stripper well, i.e. any subterranean well and combinations thereof.

The ceramic microspheres of the present invention are granulated materials with a small size and a spherical shape. Once used in a cementing material, the microspheres impart high flowability to the cementing material. The microspheres are used in cement slurries, such as oil well cement slurries, construction cement slurries, squeeze cement slurries, cutting treatment cement slurries, as extenders and light weight pozzolanic and viscosity reducing additives.

In the present disclosure, industrial slags, such as blast furnace slag (BFS), steel furnace slag (SFS) and other types of metallurgical slags, such as nickel, magnesium, copper and the like, are used to manufacture solid, hollow, cellular and massive microspheres with a controlled particle size of about 38 microns to about 150 microns.

Referring to FIG. 1, which depicts a slag spheroidization device, i.e. an apparatus for manufacturing microspheres from industrial slag. The method of manufacturing hollow, solid, cellular and/or massive ceramic microspheres begins with a ground industrial slag 16. Dependent upon the metallurgic origin of the industrial slag, the slag may have additional materials, such as sulphur, carbon and/or water dissolved in the vitreous matrix. The slag may contain between 1% w/w to 10% w/w of sulphur, less than 1% w/w of carbon and less than 1% w/w of water The ground industrial slag 16 is fed into a vibration feeder 14. Vibration feeder 14 may be any device that is well known within the art that is capable of moving volumes of bulk materials at either a fixed or variable rate. As the industrial slag 16 exits vibration feeder 14 it is contacted by a flame. The flame is supplied by a glass bench burner 12. The burner 12 propels a gas/oxygen mix flame of about 1200° C. to about 2500° C. into the industrial slag 16 as it falls from vibration feeder 14. The industrial slag 16 is molten by pyrolization 10 and spheroidized 24 as it is propelled away from burner 12 at a rate of between about 0.292 kg/h to about 0.368 kg/h.

The gas may be a natural gas, such as propane or butane, propylene, acetone, hydrogen, and/or a liquid fuel, such as petroleum or kerosene. The retention time of the industrial slag 16 in the flame is preferably between about 0.0001 s to about 0.008 s.

Continuing on FIG. 1, two collection chambers, first collection chamber 20 and second collection chamber 30, are located adjacent to burner 12. The collection chambers may be any collection space within the art, such as tubs, vats, vaults, etc., that is capable of withstanding the extreme temperatures employed in the spheroidization process.

As the pyrolized 10 particles are propelled by burner 12 in FIG. 1, they begin to rapidly air cool and are spheroidized 24. The spheroidized 24 industrial slag 16 of a coarser nature and higher density loses its burner 12 propulsion at a faster rate. As a result, these coarser spheroidized 24 industrial slag 16 microspheres settle at a distance that is closer to burner 12. The coarse microspheres 22 are collected in the first collection chamber 20.

The first collection chamber 20 is directly connected to the high temperature flame of burner 12 and is directly connected to the second collection chamber 30 at the opposite end.

When the spheroidized 24 industrial slag 16 of a finer nature and a lower density is propelled from burner 12 in FIG. 1, it tends to maintain its propulsion for a longer distance. As a result, these finer spheroidized 24 industrial slag 16 microspheres settle at a distance that is further away from the burner 12. These fine microspheres 32 are collected in the second collection chamber 30. The second collection chamber 30 is attached to the first collection chamber 20 at the opposite end of burner 12.

The slag spheroidization device of FIG. 1 also provides openings for the flow of particles, gas and air. The first collection chamber 20 has an opening 40 to allow for the entrance of the propelled pyrolized 10 industrial slag 16 from the burner 12. The first collection chamber 20 has another opening 42 directly opposite opening 40. Opening 42 connects first collection chamber 20 with second collection chamber 30. The finer spheroidized 24 industrial slag 16 microspheres continue their flight and are propelled through opening 42 into the second collection chamber. Opening 44 is a vent employed to allow the escape of gas and dust particles.

In order to achieve optimal continuous fluid extraction from a well, it is desirable to maintain zonal isolation of the fluids within the well bore. Lightweight cement slurries are used to obtain this optimal zonal isolation within the well bore. Light weight slurries may be formed from the hollow ceramic microspheres of the present disclosure.

TABLE 1

| Oxide (% by weight) | Blast Furnace Slag | Iron-nickel slag (reduction) | Iron-nickel slag (smelting) |
|---|---|---|---|
| CaO | 19-42 | 50-60 | 0-1 |
| $SiO_2$ | 32-40 | 14-60 | 40-50 |
| $Al_2O_3$ | 11-30 | 10-15 | 2-5 |
| MgO | 8-19 | 7-10 | 30-40 |
| $Fe_2O_3$ | 0-5 | 3-15 | 10-20 |
| $SO_3$ | 1-5 | 1-10 | 0-1 |
| $K_2O$ | 0-1 | 0-1 | 0-1 |
| $Na_2O$ | 0-15 | 0-1 | 0-1 |
| NiO | 0 | 0-1 | 0-1 |
| Others | 1-2 | 0-1 | 0-4 |

Table 1 shows the chemical composition of the industrial slags used for the present disclosure. As shown in Table 1, by product slag from the manufacturing process of iron nickel alloys contain less than 1% w/w of metallic nickel. The iron-nickel smelting slag is produced at the first stage of the iron manufacturing process when the natural ore is exposed to a carbon source and high temperatures. The resultant slag byproduct is cooled by water and collected/stored for disposal. The iron-nickel reduction slag is produced during the second stage of the iron manufacturing process when the resultant iron alloy collected from the smelting stage is further processed in order to remove contaminants. The resultant slag byproduct is cooled in air and collected/stored for disposal.

EXAMPLE 1

Hollow and/or cellular microspheres of the present invention may be formed from blast furnace slag having a composition as detailed in Table 1.

BFS having a concentration of about 19% w/w to about 42% w/w CaO, about 32% w/w to about 40% w/w SiO2, about 11% w/w to about 30% w/w Al2O3, about 8% w/w to about 19% w/w MgO, about 0% w/w to about 5% w/w Fe2O3, about 1% w/w to about 5% w/w SO3, about 0% w/w to about 1% w/w K2O, and about 0% w/w to about 15% w/w Na2O, is ground by any method which is well known within the art to a particle size of about to a particle size of less than about 150 microns.

The ground BFS is then manufactured to microspheres by spheroidization, such as the slag spheroidization device of FIG. 1.

Ground BFS is fed to vibration feeder 14. As the ground BFS exits vibration feeder 14 it is contacted by a flame. The flame is supplied by a glass bench burner 12. The burner 12 propels a gas/oxygen mix flame of about 1200° C. to about 2500° C. into the ground BFS as it falls from vibration feeder 14. The ground BFS is molten by pyrolization.

As the molten ground BFS particles are propelled by burner 12, they begin to rapidly air cool and are spheroidized. The spheroidized BFS of a coarser nature and higher density losses its burner 12 propulsion at a faster rate. As a result, these coarser spheroidized BFS microspheres settle in the first collection chamber 20 at a distance that is closer to the burner 12.

Most of the spheroidized BFS microspheres are of a finer nature, have a lower density and are hollow. These microspheres are generally hollowed by the decomposition of the sulphur, carbon and/or water dissolved in the vitreous matrix of the slag. As the slag is introduced to the burner 12, the sulphur, carbon and/or water dissolved in the vitreous matrix of the slag decompose generating gas, such as CO2, SO3 or H2O. The generation of these gases by the heat of burner 12 permits the production of hollow and/or cellular microspheres.

These BFS microspheres are propelled from burner 12 and tend to maintain their propulsion for a longer distance. As a result, these finer and hollow spheroidized BFS microspheres settle at a distance that is further away from burner 12.

Once the hollow spheroidized BFS microspheres settle in the second collection chamber 32, they may be collected and used to make a cement slurry. These hollow and/or cellular BFS microspheres have a density of less than about 16.7 lbs/g (pound/gallon) (2000 kg/m3 (kilogram/cubic meter)), preferably between about 7.5 lbs/g to about 16.2 lbs/g (about 900 kg/m3 to about 1940 kg/m3), and a controlled particle size of between about 40 microns to about 125 microns.

TABLE 2

| Materials | Concentration (lbm/bbl) |
| --- | --- |
| Caustic Soda | 8.00 |
| Soda Ash | 16.00 |
| Silica sand | 27.80 |
| Blast Furnace Slag (ground 325 mesh, 45 μm) | 125.95 |
| Ceramic microspheres from BFS | 152.05 |
| Dispersing agent | 0.50 |
| Water | 51.54 |
| Water base semidispersed mud (8.6 lb/g) | 85.03 |

Table 2 illustrates a possible composition for a Mud-to-Cement (MTC) slurry with a density of 11.11 lbs/g (1332 kg/m3). The MTC slurry uses 62% of field water base mud with a density of 8.6 lbs/g (1030.5 kg/m3).

EXAMPLE 2

Solid and/or massive microspheres of the present invention may be formed from iron-nickel slag having a composition as detailed in Table 1.

The iron-nickel slag of the present disclosure may have two compositions.

Composition 1 is formed by reduction having a concentration of about 50% w/w to about 60% w/w CaO, about 14% w/w to about 60% w/w SiO2, about 10% w/w to about 15% w/w Al2O3, about 7% w/w to about 10% w/w MgO, about 3% w/w to about 15% w/w Fe2O3, about 1% w/w to about 10% w/w SO3, about 0% w/w to about 1% w/w K2O, about 0% w/w to about 1% w/w Na2O, and about 0% w/w to about 1% w/w NiO.

Composition 2 is formed by fusion having a concentration of about 0% w/w to about 1% w/w CaO, about 40% w/w to about 50% w/w SiO2, about 2% w/w to about 5% w/w Al2O3, about 30% w/w to about 40% w/w MgO, a about 10% w/w to about 20% w/w Fe2O3, about 0% w/w to about 1% w/w SO3, about 0% w/w to about 1% w/w K2O, about 0% w/w to about 1% w/w Na2O, and about 0% w/w to about 1% w/w NiO.

Dependent upon the desired composition of the final microsphere product being manufactured, Composition 1 or Composition 2 is ground by any method which is well known within the art to a particle size of less than about 150 microns.

The slag composition is then manufactured to microspheres by spheroidization, such as the slag spheroidization device of FIG. 1.

The ground iron-nickel slag composition of choice is fed to vibration feeder 14. As the ground iron-nickel slag composition exits vibration feeder 14 it is contacted by a flame. The flame is supplied by a glass bench burner 12. The burner 12 propels a gas/oxygen mix flame of about 1200° C. to about 2500° C. into the ground iron-nickel slag composition as it falls from vibration feeder 14. The ground iron-nickel slag composition is molten by pyrolization.

As the molten iron-nickel slag composition particles are propelled by burner 12, they begin to rapidly air cool and are spheroidized. Most of the spheroidized iron-nickel slag composition is of a coarser nature with a higher density and it losses its burner 12 propulsion at a faster rate. As a result, the coarser spheroidized iron-nickel slag composition microspheres settle in the first collection chamber 20 at a distance that is closer to the burner 12.

Few of the spheroidized iron-nickel slag composition microspheres are of a finer nature.

Once the solid spheroidized iron-nickel slag composition microspheres settle in the first collection chamber 20, they may be collected and used to make a cement slurry. These solid and/or massive iron-nickel slag composition microspheres have a density between at least about 20.9 lbs/g to about 31.3 lbs/g (about 2500 kg/m3 to about 3750 kg/m3) and a controlled particle size of about 150 microns to 38 microns.

TABLE 3

| Materials | Concentration (lbm/bbl) |
| --- | --- |
| Dry Blend 65/35 (cement/Iron-nickel reduction microspheres) | 317.16 |
| Antifoam agent | 0.29 |
| Dispersing agent | 0.71 |
| Liquid extender | 7.89 |
| Gas control agent | 43.42 |
| Water | 198.32 |

Table 3 illustrates a possible composition for a tail slurry with a density of 13.5 lbs/g (1618 kg/m3). The slurry was made with a dry blend as cementing material. The dry blend used in this slurry was formulated with 65% w/w of a cement, such as a moderately sulfate-resistant class H cement (Cement H MSR), and 35% w/w of solid ceramic microspheres. The solid ceramic microspheres were made from an iron-nickel reduction slag with a density of 25.45 lbs/g (3050.0 kg/m3) and a particle size between about 38 microns to 53 microns. The tail slurry illustrated in Table 3 shows chemical resistance to CO2 and H2S, gas migration resistance and improved thermal cycle strength in steam injection wells.

The hollow and cellular microspheres have a density of less than 11 lbs/g (1318 kg/m3). The hollow and cellular microspheres of the present disclosure may be formulated with additional additives such as glass microspheres, alternative BFS microspheres, polymeric beads (polystyrene) or the like. These additional additives may be added to the slurry in order to reduce the density to much less than 11 lbs/g (1318 kg/m3).

Microspheres made from reduction iron-nickel slag or smelting iron-nickel slag may be used to alter the chemical resistance and/or possible expansion effect of the slurry. In addition, the use of the iron-nickel slag composition of the present disclosure in cement slurries may result in the creation of a cement slurry with weak magnetic properties. $Fe_2O_3$, $Fe_3O_4$ and $MgFe_2O_4$ both components of the iron-nickel slag composition have remnant magnetic phases which may lead to a cement slurry having magnetic rheological properties.

EXAMPLE 3

The hollow BFS microspheres of Example 1 and/or the solid iron-nickel slag composition microspheres of Example 2 above are mixed with a liquid phase that could be used for the construction of steam injection wells. Examples of liquid phases include oil based drilling fluids and water based drilling fluids. Preferably the liquid phase is a water based drilling fluid, such as water-based muds, fresh water mud, sea water mud, salt mud, brine mud, lime mud, gypsum mud, synthetic mud, semi-dispersed mud and oil-in-water emulsions. The mixture forms a slurry that is activated by reaction with a high pH solution, such as caustic soda, Portland cement type I, soda ash and/or any additional elements within the art that may increase the pH of the slurry. In order to prevent strength retrogression, other compounds such as antifoam, silica flour and additional cementing materials are added to the slurry. These additional cementing materials may include any additives that are used to control cement properties, i.e. mechanical properties, thermal properties or chemical resistance to $H_2S$ or $CO_2$. Examples of additional cementing materials are set retardants, plasticizers, glass microspheres, cementing glasses, fly ash and straightening agents.

The resultant slurries can be a homogenous MTC system which, upon solidification, possesses increased thermal cycle strength. The resultant MTC slurries are advantageously deployed into subterranean wells by any method which is well known within the art.

In order to produce well bore zonal isolation, the ceramic microspheres of the present disclosure may also be used as an alternative to Portland cement in mud-to-cement (MTC) applications. The use of the microspheres of the present disclosure in MTC applications may also reduce the operational costs of well cementing activities by reducing the environmental impact of the mass consumption of ordinary cement slurries.

The ceramic microspheres of the present disclosure used in cementing applications have led to the creation of lightweight cement slurries that are resistant to elevated temperatures and thermal cycling, such as those found in steam injection techniques.

The ceramic microspheres of the present invention may be implemented in other possible applications. The final physical and chemical characteristics of the microspheres of the present invention may be applied to conventional cementing well technology, blended cement manufacturing, bridge construction, dam construction, onshore/offshore construction, coastal infrastructure, and any application that may benefit from the cementitious/pozzolanic properties of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for manufacturing ceramic microspheres from industrial slag, comprising:
a glass bench burner:
a vibration feeder arranged to feed industrial slag to the glass bench burner;
a first collection chamber having an inlet, an outlet and a first collection zone, the inlet being aligned with the glass bench burner to receive a stream of propelled industrial slag from the glass bench burner;
a second collection chamber having an inlet which is aligned with the outlet of the first collection chamber, whereby a first portion of the propelled industrial slag falls into the first collection zone, and second portion of the propelled industrial slag, separate from the first portion, passes through the outlet of the first collection chamber and the inlet of the second collection chamber; and
a wall fixed between the first collection chamber and the second collection chamber, wherein the outlet of the first collection chamber is defined in the wall, whereby the first portion of propelled industrial slag hits the wall and remains in the first collection chamber, and the second portion passes through the outlet of the first collection chamber and the inlet of the second collection chamber into the second collection chamber.

2. The apparatus of claim 1, wherein the glass bench burner produces a gas/oxygen mix flame of about 1200° C. to about 2500° C.

3. The apparatus of claim 2, wherein the gas is a natural gas.

4. The apparatus of claim 1, wherein the first collection chamber is directly connected to the flame of the burner at one end and is directly connected to the second collection chamber at the opposite end.

5. The apparatus of claim 1, wherein the second collection chamber has a discharge vent.

* * * * *